UNITED STATES PATENT OFFICE.

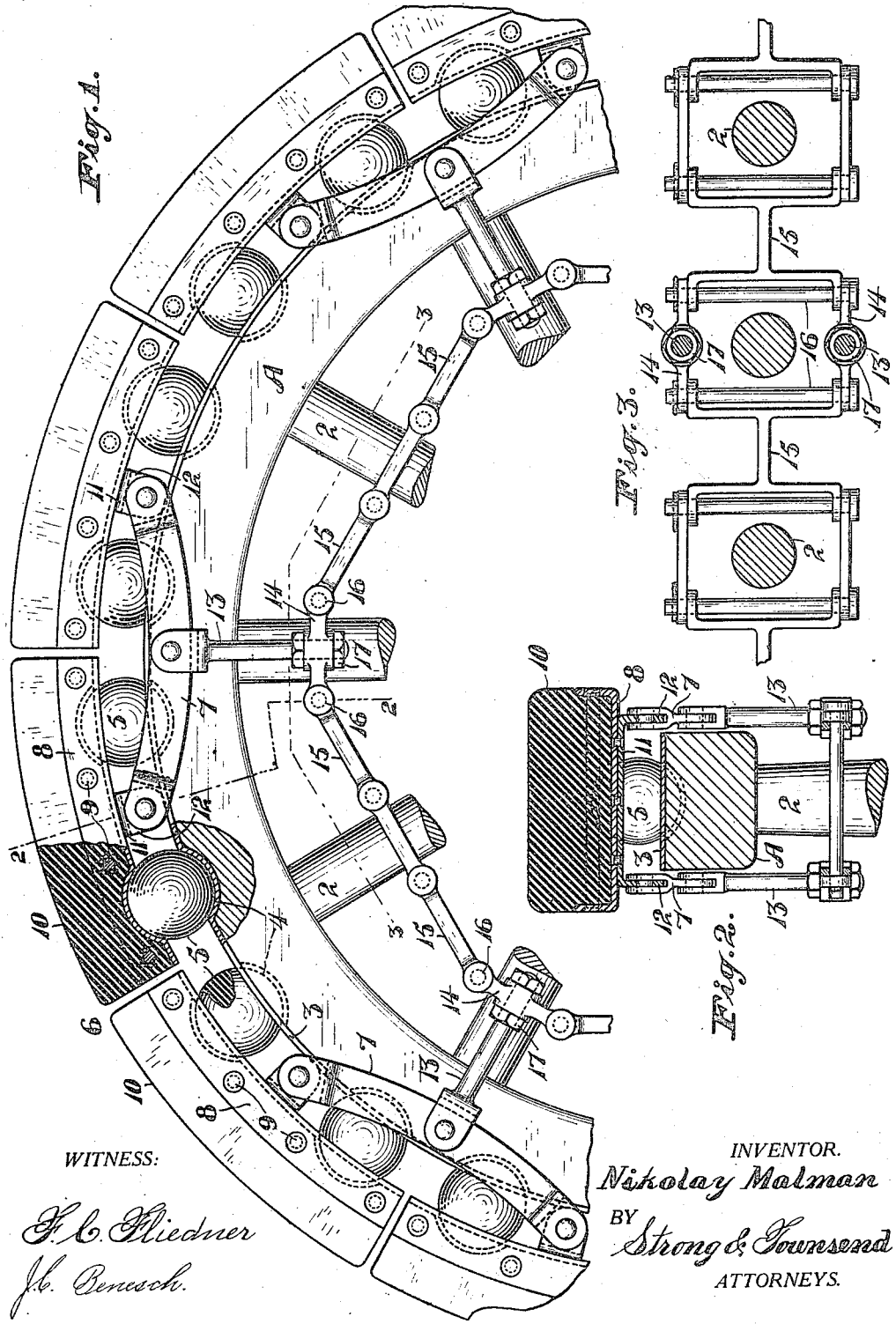

NIKOLAY MALMAN, OF SAN FRANCISCO, CALIFORNIA.

RESILIENT WHEEL.

1,259,424.   Specification of Letters Patent.   Patented Mar. 12, 1918.

Application filed August 8, 1917. Serial No. 185,042.

*To all whom it may concern:*

Be it known that I, NIKOLAY MALMAN, a citizen of the United States, residing at the city and county of San Francisco, and State of California, have invented new and useful Improvements in Resilient Wheels, of which the following is a specification.

This invention relates to a resilient tire.

One of the objects of the present invention is to provide a simple, substantial, cheaply manufactured, puncture-proof, resilient tire for vehicle wheels, and particularly to provide a sectional tire consisting of a plurality of shoes which are connected by links and secured to the rim of the wheel by a single chain of special construction, hereinafter to be described. Another object of the invention is to provide resilient members which are interposed between each individual tire section and the rim, and to provide means operable in conjunction with the connecting links and the single chain specified for increasing or decreasing the resiliency or tension between the sections of the tire and the rim. Further objects will hereinafter appear.

The invention consists of the parts and the construction and combination of parts as hereinafter more fully described and claimed, having reference to the accompanying drawings, in which—

Figure 1 is a side elevation, partly broken away and partly in section, showing the construction of the resilient tire and the wheel to which it is applied.

Fig. 2 is a cross section on the line 2—2 of Fig. 1.

Fig. 3 is a plan section, taken on the line 3—3 of Fig. 1.

Referring to the drawings in detail, A indicates the rim or felly of the wheel and 2 the spokes. Surrounding the exterior face of the felly is a continuous steel band or ring 3, and formed in the face of said band and the felly is a plurality of pockets 4 which serve as seats or receptacles for cushion members, such as indicated at 5. These members are preferably constructed of rubber and are spherical in shape.

Mounted exteriorly of the felly and the ring 3 surrounding same is the resilient tire proper, which consists of a plurality of shoes, generally indicated at 6. Any suitable number of shoes may be employed and each shoe comprises a channel plate 8, between the flanges of which are secured a suitable number of key bolts 9. Each shoe is otherwise provided with a rubber block 10 which is vulcanized in position and held in the shoe by means of the key bolts 9. Each shoe is also provided on its inner face with a bearing plate 11 riveted thereto, the outer ends of which are turned down, as at 12, to form connections for the links generally indicated at 7 which will hereinafter be described.

The inner face of each shoe is provided with a pair of pockets or depressions for the reception of the resilient members 5 and as these depressions are formed in alinement with the pockets 4, formed in the rim and the felly of the wheel, it can readily be seen that a pair of resilient members may be employed in connection with each shoe. The shoes are connected in pairs by links 7. These links are fork-shaped at each end to straddle the bearing lugs 12, and each link is provided with a pivotally connected screw-rod 13 which is adapted to be adjustably secured in links 14 forming part of a single chain structure such as shown in Fig. 3. This chain consists of the links 14 and intermediate links 15 which are pivotally connected by pins or bolts 16. The ends of the links 15 are T-shaped, as indicated, to straddle the spokes 2 and the links 14 applied exteriorly of same and connected therewith by the pins 16 form a complete inclosure for each individual spoke, thereby retaining the chain in a central position and also preventing it from swinging out of alinement with the felly and spokes.

The links 14 are centrally enlarged, perforated and threaded for the reception of the bolts 13, and as nuts 17 are provided it becomes possible to draw the bolts, together with the links 7 and the shoes 6 attached thereto, inwardly with relation to the felly, thereby compressing the resilient members 5 and consequently increasing or decreasing the resiliency of the shoe-like tire surrounding the felly. The shoes, as shown in Fig. 1, are only connected in pairs by the links 7 while the chain structure generally shown in Fig. 3 connects the pairs in series.

Each shoe contained in the tire structure as a whole is permitted a free pivotal movement about the bearing lugs 12 and the outer ends of the links 7, thereby increasing the resiliency and the tractive quality of the tire. Practically any tension between the outer tire and the felly may be obtained by tightening up the bolts 13 to render displacement in a lateral direction impossible; such displacement being further guarded against by the position of the bolts 13 and the construction of the chain shown in Fig. 3. That is, any tendency toward lateral displacement of any shoe or number of shoes with relation to the felly will cause the bolts 13 to engage the sides of the rim and thereby limit lateral movement in either direction, this being also true of the chain structure provided.

The tire as a whole may be replaced by providing new shoes or any individual shoe may be replaced as conditions may require.

The materials and finish of the several parts employed may also be such as the experience and judgment of the manufacturer may dictate.

I wish it understood that various changes in form, proportions and minor details of construction may be resorted to within the scope of the appended claims and that I do not wish to limit myself to the specific design and construction here shown.

Having thus described my invention, what I claim and desire to secure by Letters Patent is—

1. The combination with the felly of a wheel, of a tire surrounding the felly, said tire comprising a plurality of shoes, links connecting the shoes in pairs, means connecting each pair in series, and a pair of resilient members interposed between each shoe and the felly.

2. The combination with the felly of a wheel, of a tire surrounding the felly, said tire comprising a plurality of shoes, links connecting the shoes in pairs, a flexible member, and means connecting the links with the flexible member to connect the pairs in series.

3. The combination with the felly of a wheel, of a tire surrounding the felly, said tire comprising a plurality of shoes, links connecting the shoes in pairs, a flexible member, means connecting the links with the flexible member to connect the pairs in series, and compressible members interposed between each shoe and the felly.

4. The combination with the felly of a wheel, of a tire surrounding the felly, said tire comprising a plurality of shoes, a pair of resilient members interposed between each shoe and the felly, a pair of links connecting each pair of shoes, a chain intermediate the hub and the felly of the wheel, and a screw bolt connecting the center portion of each link with the chain.

5. The combination with the felly of a wheel, of a tire surrounding the felly, said tire comprising a plurality of shoes, a pair of resilient members interposed between each shoe and the felly, a pair of bearing lugs centrally positioned, one on each side of each shoe, a pair of links pivotally attached to said bearing lugs and connecting successive pairs of shoes, and a flexible connection between said links.

6. The combination with the felly of a wheel, of a tire surrounding the felly, said tire comprising a plurality of shoes, a pair of resilient members interposed between each shoe and the felly, a pair of bearing lugs centrally positioned, one on each side of each shoe, a pair of links pivotally attached to said bearing lugs and connecting successive pairs of shoes, a chain interiorly of the felly consisting of double links positioned one on each side of each spoke, single links pivotally connected with each set of double links and perforated enlargements on each double link, and radially disposed rods threaded on their inner ends extending through the perforated double links and secured therein by nuts and pivotally connected at their outer ends to the links connecting each successive pair of shoes.

In testimony whereof I have hereunto set my hand in the presence of two subscribing witnesses.

NIKOLAY MALMAN.

Witnesses:
G. C. MARTIN,
H. S. SPAULDING.